Patented Apr. 5, 1932

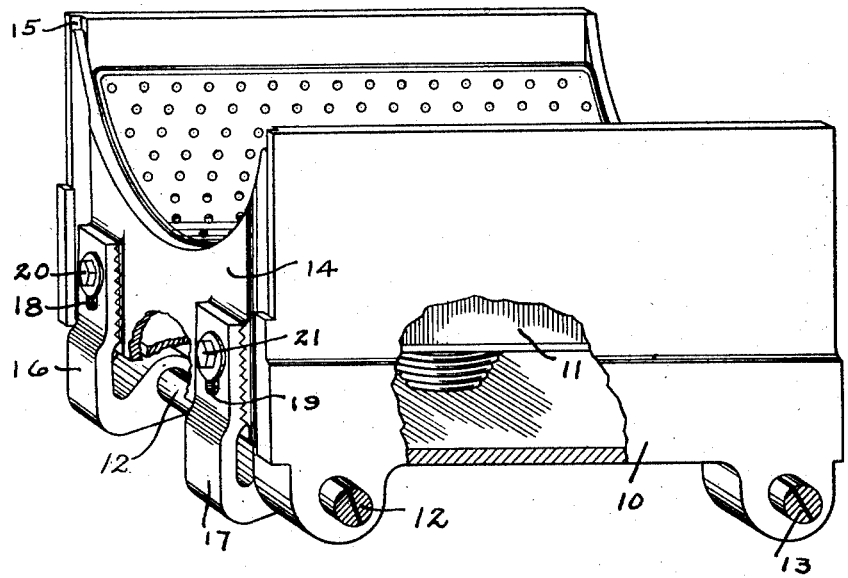

1,852,304

UNITED STATES PATENT OFFICE

ERNEST A. HILDEBRANDT AND CHARLES A. MARTIN, OF INDIANAPOLIS, INDIANA

GREASE CELLAR END GATE

Application filed March 23, 1931. Serial No. 524,618.

This invention relates to means for mounting and removing end gates to grease cellars in locomotive driving journal boxes and has for a primary purpose the provision of a structure whereby the end gate of the cellar may be removed for inspection and replacement of grease cakes without having to drop the cellar out of the journal box.

Another important object of the invention is to provide an end gate vertically adjustable to permit the maintaining of a close fit between the end gate and the journal to prevent the entrance of dirt into the box.

In the heretofore employed locomotive driving journal boxes, the grease cellars have been retained in the boxes by horizontally disposed keys, generally cotter keys, and the end gate was supported on the key by the key being threaded through the under side of the gate in such a manner that the key must be pulled out in order to drop the end gate and to pull out the key removed the support for the cellar which also was dropped. To bend the ends of the key and remove it was quite a job under the locomotive. As the journal or the journal brass wore down the grease cellar correspondingly dropped to lower the upper edge of the end gate away from the under side of the journal and the gate was removed and the edge built up by brazing to close up the gap.

Our invention eliminates these difficulties as will be apparent in the following description as illustrated by the accompanying drawings, in which Fig. 1 is a fragmentary perspective view of a grease cellar embodying our invention;

Fig. 2, a front elevation of the cellar with a modified form of end gate;

Fig. 3, a vertical longitudinal section on the line 3—3 in Fig. 2;

Fig. 4, a front elevation of still further modified form of end gate; and

Fig. 5, a vertical section on the line 5—5 in Fig. 4.

Like characters of reference indicate like parts throughout the several views in the drawings.

The grease cellar 10 is of the usual construction having a grease cake 11 therein and supported by the keys 12 and 13. An end gate 14, Fig. 1, is mounted on the inner end of the cellar 10 in vertical slots 15. A pair of arms 16 and 17 are rockably carried on the key 12 and curve around and upwardly therefrom to bear against the outer face of the gate 14. The upper ends of the arms are provided with slots 18 and 19 respectively through which cap screws 20 and 21 are inserted and screw-threadedly engaged in the end gate.

Both arms 16 and 17 have transverse corrugations across their faces, which corrugations are adapted to register in corresponding corrugations on the outer face of the gate 14. By loosening the cap screws 20 and 21 the arms 16 and 17 may be swung outwardly from the gate sufficiently to permit the gate to be raised and lowered as may be desired after which the arms may be swung in to have the corrugations register with the gate corrugations and the cap screws then tightened to maintain that adjustment. The corrugations prevent vertical movement of the gate in relation to the arms even under the vibration arising during the running of the locomotive.

To remove the gate, the cap screws 20 and 21 are taken out and the arms 16 and 17 swung around to hang downwardly after which the gate 14 may be pulled downwardly and out of the grooves 15, the pin 12 being sufficiently behind the path of the gate 14 to permit the gate to pass downwardly without striking the arms there supported. Access is then had to within the cellar 10, all without having to remove the pin 12.

Referring to Figs. 2 and 3, a modified form of our invention is illustrated in which a single arm 22 is employed having the two rearwardly turned ears 23 and 24 through which the pin 12 passes. The arm 22 has a center corrugated portion adapted to register with a similar corrugated surface on the gate and a single cap screw 25 is inserted through the center slot 26. The removal and replacement of the gate is accomplished in the same manner as above described.

In those types of cellars where the gate is not supported between vertical slots, the modified form as shown in Figs. 4 and 5 is preferable in order to retain the gate tightly against the cellar particularly along its upper portion. Referring to Figs. 4 and 5, the gate 27 is here shown as merely abutting the outwardly vertical edges of the cellar 28 and is supported by the single cap screw 29 inserted through the slot 30 in the arm 31. This arm 31 has a corrugated surface registering with a similar corrugated surface on the gate 27 and is rockably supported on the key or pin 32 by the spaced apart ears 33 and 34, the ear 33 being spaced to one side of the center line of the cellar and carrying a foot 35 which contacts with the cellar to hold the arm 31 in a vertical position tending to press the gate 27 against the cellar. To remove the gate 27 in this form, the cap screw 29 is removed and the arm 31 slipped horizontally along the pin 32 to carry the foot 35 over into the opening between the supporting bosses of the key 32 whereupon the arm 31 may be rocked about the key 32 away from the gate 27 which may then be pulled directly outwardly from the cellar.

While we have here shown and described our invention in the best forms as now known to us, it is obvious that structural changes may be made therefrom and we therefore do not desire to be limited to those precise forms, nor any more than may be required by the following claims.

We claim:

1. For a locomotive driving journal box grease cellar, an end gate, a transverse pin below the gate, an arm rockably mounted on the pin, opposed corrugated surfaces on the arm and the gate, and a cap screw adapted to be passed through the arm into the gate whereby the gate may be selectively held at various elevations by said bolt in cooperation with the intermeshing of said surfaces.

2. For a locomotive driving journal box grease cellar, a cellar supporting key, an end gate vertically guided in an end of the cellar, said key being back of said gate whereby the gate may be pulled downwardly past the key and out of the cellar, an arm rockably mounted on the key and adapted to be rocked around to extend vertically upward on the outer side of said gate, a corrugated surface on the side of the arm toward the gate, a corresponding corrugated surface on the gate to receive thereagainst said arm surface, said arm being slotted, and a cap screw passed through the slot of the arm screw-threadedly into said gate.

3. For a locomotive driving journal box grease cellar, an end gate, a transverse pin below the gate, an arm rockably mounted on the pin and having a slot through its upper portion, and a cap screw through said arm slot screw-threadedly engaging said gate.

4. For a locomotive driving journal box grease cellar, an end gate, a transverse pin below the gate, an arm rockably mounted on the pin and having a slot through its upper portion, and a cap screw through said arm slot screw-threadedly engaging said gate, and a foot on said arm adapted to contact with said cellar to prevent said gate from rocking outwardly from the cellar.

In testimony whereof we affix our signatures.

ERNEST A. HILDEBRANDT.
CHARLES A. MARTIN.